United States Patent [19]
Swartz

[11] Patent Number: 5,825,402
[45] Date of Patent: Oct. 20, 1998

[54] METHOD AND APPRATUS FOR READING AND WRITING INDICIA SUCH AS BAR CODES USING A SCANNED LASER BEAM

[75] Inventor: Jerome Swartz, Old Field, N.Y.

[73] Assignee: Symbol Technologies, Inc., Holtsville, N.Y.

[21] Appl. No.: 37,749

[22] Filed: Mar. 26, 1993

[51] Int. Cl.[6] .............................. B41J 2/47; G01D 15/14; H04N 1/21; G06K 7/20
[52] U.S. Cl. ........................ 347/251; 347/129; 235/462; 358/298
[58] Field of Search ..................... 358/296, 128, 358/298; 347/251, 240, 111, 256, 241, 130, 262, 264; 399/84, 367, 111; 235/1, 468, 462, 494

[56] References Cited

U.S. PATENT DOCUMENTS

| | | |
|---|---|---|
| 2,634,220 | 4/1953 | Oriel . |
| 3,293,650 | 12/1966 | Buros . |
| 3,676,644 | 7/1972 | Vaccaro et al. . |
| 3,742,833 | 7/1973 | Sewell et al. ............................ 347/224 |
| 3,761,683 | 9/1973 | Rogers . |
| 3,862,806 | 1/1975 | Brown . |
| 4,085,423 | 4/1978 | Tsunoda et al. ........................ 358/128 |
| 4,115,602 | 9/1978 | Bullard . |
| 4,188,139 | 2/1980 | Pasini et al. . |
| 4,641,346 | 2/1987 | Clark et al. . |
| 4,684,795 | 8/1987 | Colgate, Jr. . |
| 4,699,531 | 10/1987 | Ulinski, Sr. et al. . |
| 4,734,713 | 3/1988 | Sato et al. . |
| 4,739,377 | 4/1988 | Allen . |
| 4,786,195 | 11/1988 | Hibino et al. . |
| 4,794,239 | 12/1988 | Allais . |
| 4,834,567 | 5/1989 | Ueno . |
| 4,908,813 | 3/1990 | Ojima et al. ............................ 250/201 |
| 4,924,321 | 5/1990 | Miyagawa et al. ..................... 358/296 |
| 4,945,215 | 7/1990 | Fukushima et al. . |
| 4,952,785 | 8/1990 | Kikuda . |

(List continued on next page.)

FOREIGN PATENT DOCUMENTS

| | | |
|---|---|---|
| 27 21 490-A1 | 5/1977 | Germany . |
| 63-278984 | 11/1988 | Japan . |
| 1-95082 | 4/1989 | Japan . |
| 3-286879 | 12/1991 | Japan . |
| 4-142970 | 5/1992 | Japan . |

OTHER PUBLICATIONS

R.J. Collier, et al., *Optical Holography*, Academic Press, New York (1971), Chapter 16 "Information Storage", pp. 454–493.

H.J. Caulfield, *Handbook of Optical Holographyp*, Academic Press, New York (1979), Chapter 10.1 "Digital Data Storage", pp. 379–413.

J. Swartz, "Bar Codes and Other Technology Leaps", New York Times, Jun. 6, 1993, Long Island Section 10.2

Zech, "Mass Storage Future Perfect?", *Optics & Photonics News*, (Aug. 1992).

Wild et al., "Hole burning, Start effect, and data storage", *Applied Optics*, vol. 24, No. 10 (May 15, 1985).

Kohler, et al., "Storage of 2000 holograms in a photochemical hole–burning system", *Optics Letters*, vol. 18, No. 24 (Dec. 15, 1993).

*Primary Examiner*—Benjamin R. Fuller
*Assistant Examiner*—Raquel Yvette Gordon
*Attorney, Agent, or Firm*—Fish & Richardson P.C.

[57] ABSTRACT

A system for reading and writing indicia on a medium including a light source for producing a light beam; a reading element for directing the light beam at the medium so as to scan indicia disposed on a first portion of said medium, detecting at least a portion of the light of variable intensity reflected off the indicia, and generating an electrical signal indicative of the detected light intensity; and a writing element for directing the light beam at the medium in a pattern on a second portion of the medium so as record information on the medium. The light beam is preferably a laser beam generated by a semiconductor laser, and a mirror is used to scan the beam both for reading and writing.

19 Claims, 1 Drawing Sheet

U.S. PATENT DOCUMENTS

| | | |
|---|---|---|
| 5,014,072 | 5/1991 | Yamaguchi et al. ............... 346/76 PH |
| 5,021,975 | 6/1991 | Yamanashi . |
| 5,059,776 | 10/1991 | Antes . |
| 5,121,432 | 6/1992 | Gilham et al. . |
| 5,248,856 | 9/1993 | Mallicoat . |
| 5,252,987 | 10/1993 | Eid et al. . |
| 5,276,674 | 1/1994 | Tanaka . |
| 5,278,128 | 1/1994 | Hotta et al. . |
| 5,289,407 | 2/1994 | Strickler . |
| 5,291,320 | 3/1994 | Peak . |
| 5,298,476 | 3/1994 | Hotta et al. . |

METHOD AND APPRATUS FOR READING AND WRITING INDICIA SUCH AS BAR CODES USING A SCANNED LASER BEAM

BACKGROUND OF THE INVENTION

1. Field of the Invention

The present invention relates to laser light scanning systems which "read" or "write" indicia, for example, bar code symbols, having parts with different light reflectivities, and, in particular, to control circuitry which enables a single scanning system to adaptively alter a light beam pattern in response to control signals to perform either a "read" or "write" operation.

2. Description of the Related Art

Various optical readers and optical scanning systems have been developed heretofore for reading bar code symbols appearing on a label, or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals which are decoded into alphanumerical characters. The resulting characters are descriptive of the article and/or some characteristic of the article to which the symbol is attached. Such characters are typically an input data to a data processing system for applications in point-of-sale processing, inventory control, and the like.

As used in this specification and in the following claims, the terms "symbol", "bar code," and "bar code symbol," are used to denote a pattern of variable-width bars separated by variable-width spaces. The foregoing terms are intended to be broadly construed to cover many specific forms of one- and two-dimensional patterns including alpha-numeric characters, as well as, bars and spaces.

The specific arrangement of bars or elements in a symbol defines the character represented according to a set of rules and definitions specified by the code. This is called the "symbology" of the code. The relative size of the bars and spaces is determined by the type of code used, as is the actual size of the bars and spaces. The number of characters per inch represented by the barcode symbol is referred to as the density of the symbol.

To encode a desired sequence of characters, a collection of element arrangements are concatenated together to form the complete symbol, with each character being represented by its own corresponding group of elements. In some symbologies, a unique "start" and "stop" character is used to indicate where the barcode symbol begins and ends. A number of different barcode symbologies presently exist. These symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of characters vertically instead of extending symbols bars horizontally. That is, there are several rows of bar and space patterns, instead of one long row. The structure of Code 49 is described in U.S. Pat. No. 4,794,239. Another two-dimensional code structure known as PDF417 is described in published European Patent Application Serial No. 90119399.5, commonly assigned to the assignee of the present invention, and hereby incorporated by reference.

Scanning systems for reading bar codes have been disclosed, for example, in U.S. Pat. Nos. 4,251,798; 4,369,361; 4,387,297; 4,409,470; 4,760,248; 4,896,026, all of which have been assigned to the present invention. As disclosed in some of the above patents, and particularly in U.S. Pat. No. 4,409,470, one existing scanning systems comprises a hand-held, portable laser scanning head. The hand-held scanning system is configured to allow a user to manually aim a light beam emanating from the head at a target symbol.

These scanning systems generally include a light source consisting of a gas laser or semiconductor laser. The use of semiconductor devices as the light source in scanning systems is especially desirable because of their small size, low cost and low power requirements. The laser beam is optically modified, typically by a focusing optical assembly, to form a beam spot having a certain size at a predetermined target location. Preferably, the cross section of the beam spot at the target location approximates the minimum width between symbol regions of different light reflectivity, i.e., the bars and spaces.

In the conventional scanning systems, the light beam is directed by lens or similar optical components along a light path toward a target symbol. The scanner operates by repetitively scanning the light beam in a line or a series of lines across the target symbol by movement of a scanning component such as a mirror disposed in the path of the light beam. The scanning component may sweep the beam spot across the symbol, trace a scan line across and beyond the boundaries of the symbol, and/or scan a predetermined field of view.

Scanning systems also include a sensor or photodetector which functions to detect light reflected or scattered form the symbol The photodetector or sensor is positioned in the scanner in an optical path so that it has a field of view which extends at least across and slightly beyond the boundaries of the symbol A portion of the light beam reflected from the symbol is detected and converted into an analog electrical signal.

The analog electrical signal produced by the photodetector is converted by a digitizer circuit in the scanner into a pulse-width modulated digital signal having widths corresponding to the physical widths of the symbol elements.

The pulse-width modulated digitizer signal from the digitizer is decoded, based upon the specific symbology used for the symbol, into a binary data representation of the data encoded in the symbol. The binary data may then be subsequently decoded into the alphanumeric characters represented by the symbol.

The decoding process in conventional scanning systems usually works in the following way. The decoder receives the pulse-width modulated digital signal from the scanner, and an algorithm implemented in software attempts to decode the scan. If the start and stop characters and the characters between them are successfully and completely decoded, the decoding process terminates and an indicator (such as a green light and/or an audible beep) is initiated to inform the user. Otherwise, the decoder receives a next scan, attempts another decode on the scan, and so on, until a completely decoded scan is achieved or no more scans are available.

Scanning systems for writing or printing indicia have been disclosed, for example, in U.S. Pat. Nos. 4,085,423 and 4,908,813. The use of thermally sensitive paper, or utilizing dyes which are sensitive to radiation in a particular frequency spectrum, is known for use in printing systems, such as exemplified in U.S. Pat. No. 5,014,072.

Prior to the present invention, there has not been a single apparatus which is designed to perform both reading and writing on the same document or medium.

SUMMARY OF THE INVENTION

Briefly and in good general terms the invention provides a system for reading and writing indicia on a medium including a light source for producing a light beam; a reading assembly for directing the light beam in a pattern at the indicia on a first portion of the medium and detecting at least a portion of the light of variable intensity reflected off the indicia and for generating an electrical signal indicative of the detected light intensity. A writing assembly is further provided for directing the light beam in a pattern on a second portion of the medium so as record information on the medium. The writing assembly includes a circuit for pulsing the light source as the light beam is scanned in a pattern on the second portion of the medium.

The novel features characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

Figure 1:
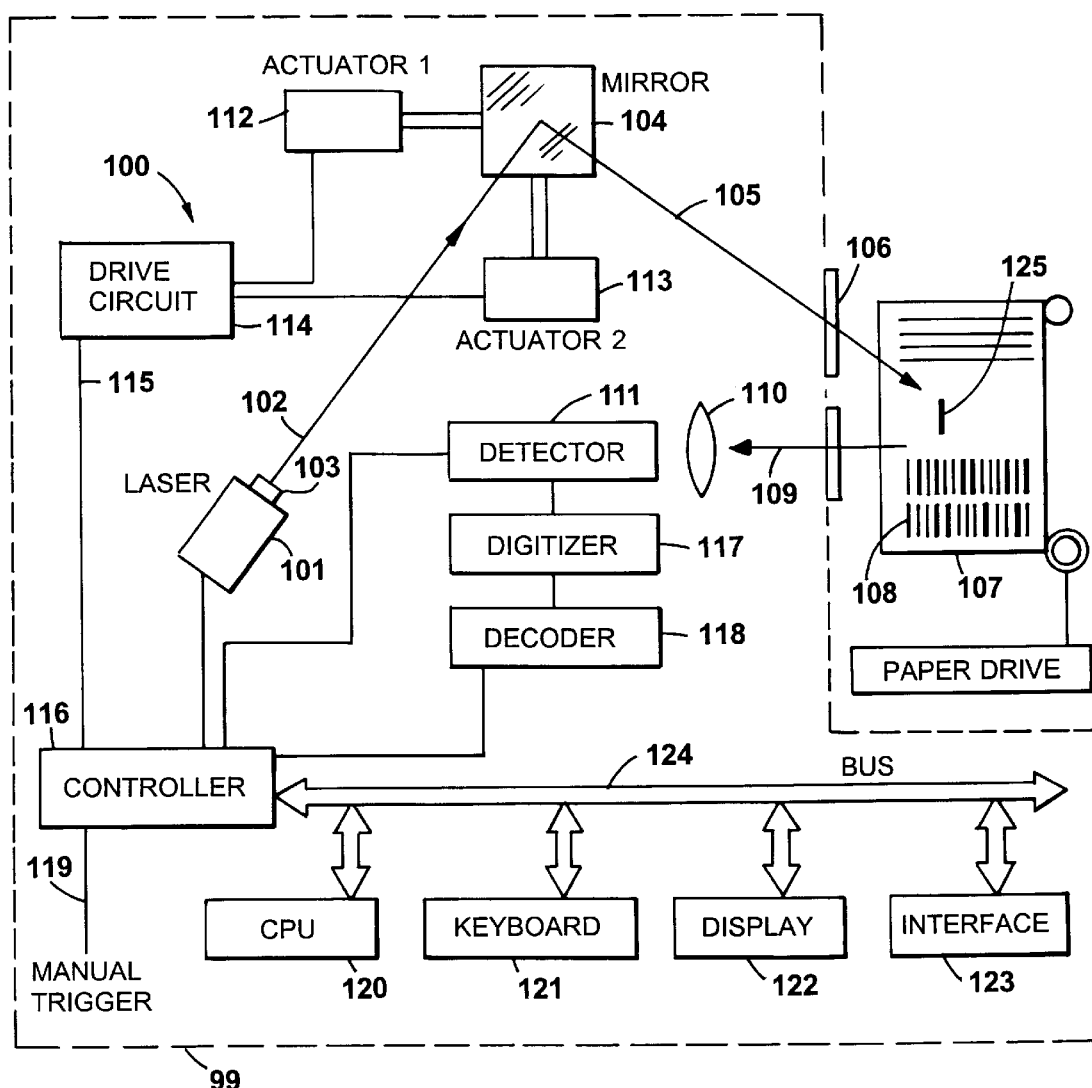
FIG. 1 is a highly simplified block diagrammatic representation of a scanning system for reading and writing bar codes or other indicia.

As used in this specification and the following claims, the term "symbol" and "bar code" is intended to be broadly construed and to cover not only patterns composed of alternating bars and spaces of various widths, but also other one or two dimensional graphic patterns, as well as alphanumeric characters.

The invention generally relates to a scanner systems utilizing a light source for reflecting light off indicia of different light reflectivity such as bar code symbols. More particularly, the invention provides a scanner system in which adjustment of various optical parameters of the scanning beam and/or electrical parameters of the light detecting and processing circuitry is automatically made to effect appropriate values for either reading or writing operations, such as by suitably varying the sweeping and/or pulsing of the laser light source. The invention further provides a method for operating a scanner system by providing signals to the current drive of the light source and the scanning motor controller in response to detection of indicia which represents a control signal to change from reading or writing operation.

The present invention also relates to scanning systems incorporating techniques for automatically initiating and terminating scanning of the target. One feature of some scanner systems is the use of a manually operated trigger to initiate scanning of the target, such as described in U.S. Pat. No. 4,387,297. Although for many applications the use of a trigger is an important feature, there are some applications in which it may be desirable to use alternate activation techniques to initiating scanning, and such techniques are described herein and also within the scope of the present invention.

In a barcode scanner, it is common for various operational parameters to be defined in software to adapt the scanner for use in specific applications. For example, the data rate of information transfer, or other interface parameters, as well as the types of symbologies to be decoded, are frequently determined by the user or by the scanner manufacturer and the specific scanner model configured for the applications environment in which it is to operate.

Sometimes it is also desirable to adjust or modify the electrical parameters or functions of certain scanner hardware to better enable the scanner to perform in reading symbols associated with a particular application. For example, a scanner that is to be used to read dot matrix printed symbols on a high speed conveyor needs to have certain parameters set in a particular way compared to a scanner used to read stationary high density symbols.

To optimize the performance of a bar code scanner, such parameters as motor speed, amplifier gain, laser power amplifier bandwidth and digitizer thresholds are commonly adjusted and set at the time of manufacture or upon installation of the scanner. Such adjustment has typically been performed by installing particular component values on the circuit board or by adjusting trimpots. A skilled technician or engineer is needed to properly determine how these adjustments are to be made.

The present invention provides adjustable circuitry in a bar code scanner for both reading and writing such that all the types of adjustments mentioned above, and perhaps others, can be made under the control of a microprocessor. The same microprocessor used to decode symbols and/or interface with external equipment can be used for such adjustment operations. Such adjustments may be made during the manufacturing process for producing different models of bar code readers having predetermined or preset operating characteristics for dedicated use by the customer. Such adjustments may also be implemented by the customer at the time of installation, or at the beginning of a particular job. Such adjustments can also be made by the scanner automatically when placed in a "self-adjusting" mode, so that the scanner automatically adjusts to the symbol being presented to it.

Microprocessors can make these adjustments of optical and electrical parameters in various ways depending upon the accuracy and resolution needed. Examples of circuits that can be implemented in order to enable the microprocessor to make these adjustments are digital to analog convertors, digital potentiometers, analog switches, FETs and transistors.

The present invention also provides a method and apparatus for operating a bar code reading system in which two different types of bar codes may be read or written—a standard linear bar code, and a two-dimensional bar code. The present invention also provides a technique for adjusting the spatial coverage or vertical sweep of the scanning beam, the detector electronics, and the appropriate decoder software in order to accurately performed both reading and writing of a two dimensional bar code.

Referring to FIG. 1, there is shown a highly simplified block diagram representation of an embodiment of one type of bar code read/write apparatus that may be designed according to the principles of the present invention. The apparatus 100 may be implemented in a portable scanner, or preferably as a desk-top workstation or stationery scanner. In the preferred embodiment, the apparatus is implemented in a light-weight plastic housing 99.

Turning in FIG. 1 in more detail, an outgoing light beam 102 is generated in the reader 100 by a light source 101, usually a laser diode, light emitting diode, or the like. The light beam from light source 101 is optically modified by an optical assembly 103 to form a beam having certain characteristics. The beam sized and shaped by the assembly 103 is applied to a mirror or scanning unit 104. The light beam is deflected to the scanning unit 104 in a specific scanning pattern, i.e. to form a single line, a linear raster scan pattern, or more complex pattern. The scanned beam 105 is then directed by the scanning unit 104 through an exit window 106 to impinge upon a target 107 disposed a few inches from the front of the reader. In the embodiments in which the reader 100 is portable, the user aims or positions the portable unit so this scan pattern transverses the symbol 108 to be read. Reflected and/or scattered light 109 from the symbol is collected by a lens 110 and detected by a light detector 111 in the apparatus, producing electrical signals to be processed and decoded for reproducing the data represented by the bar code. As used hereinafter, the term "reflected light" shall mean reflected and/or scattered light.

The scanning characteristics of the mirror 104 may be independently controlled by drive units 112 and 113. The drive units are operated by control signals from a drive circuit 114, which is responsive to digital control signals sent over the control bus 115 by a central processing unit or controller 116, which is preferably implemented by means of a microprocessor contained in the housing 99.

The light detector 111 includes an analog amplifier having an adjustable or selectable gain and bandwidth. The controller 116 is connected to the light detector to effect the appropriate adjustment of circuit values in the analog amplifier 110 in response to control signals applied to the control unit 112 over the control bus 126.

An output of the light detector 111 is applied to a digitizer 117. The digitizer 117 converts the analog signal from the light detector 111 into a pulse width modulated digital signal One type of digitizer is described in U.S. Pat. No. 4,360,798. As previously noted, circuits such as those contained in digitizer 117 have variable threshold levels which, according to the present invention, can be appropriately adjusted. The digitizer control unit 116 is connected to the digitizer 117 and functions to effect the appropriate adjustment of threshold levels in the digitizer 117 in response to control signals applied to the control unit 116 by the CPU 120 over the control bus 124.

The output of the digitizer 117 is applied to a decoder 118. The operation of the decoder 118 apparatus is similar to that as described in prior art devices such as noted in the Background of Invention section.

One of the key characteristics of the invention is to provide a suitable medium that can accommodate both reading, writing, and possibly even erasing. An example of a medium that is suitable for both reading and writing is thermal paper. In the writing mode, the laser light source may be pulsed so that it will image a sequence of dots upon the medium as the beam is scanned. Of course, in such applications the scanner must be fixed and stationary, so that an alphabetic or numeric character can be composed by an appropriate two dimensional sequence of dots.

Reference may be made to U.S. patent application Ser. No. 789,705, filed Nov. 8, 1991 and assigned to the same assignee as the present application, and herein incorporated by reference, to illustrate scanning in two directions by a single mirror 104.

The apparatus may be switched from reading to writing mode (and vice-versa) by means of a manual switch 119. The switch provides an input to the controller 116, which in turn provides the appropriate control signals to the drive circuit 114, the laser 101, and the detector 111 depending upon the mode selected.

The apparatus 100 may also include a CPU 120, a keyboard 121, display 122, and interface 123 for connection to external peripheral devices. Such components may be connected along a control and data bus 124 to each other and to the controller 116.

Another method of switching from reading to writing mode may be performed automatically under control of the CPU 120. In such an embodiment, a control indicia 125 is provided on the medium. Such indicia is situated on the medium at the point at which it is desired to switch from reading to writing.

Although the present invention has been described with respect to reading or writing one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned, and information printed or recorded thereon.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition and printer systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition and printing system.

The module would advantageously comprise an optics subassembly mounted on a support, and a photodetector and signal processing subassembly. Control or data lines associated with such subassemblies may connected to an electrical connector mounted on the edge or external surface of the module to enable the module to be electrically connected to a mating connector associated with other elements of data acquisition or processing system.

An individual module may have specific scanning, decoding, or printing characteristics associated with it, e.g. operability at a certain working distance, or operability with a specific symbology or printing speed or density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained fixed or portable data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in it is not intended to be limited to the details shown, since various modifications and structural changes may be made without departing in any way from the spirit of the present invention.

What is claimed is:

1. A system for reading and writing bar code symbols on a medium, the bar code symbols comprising bar and space elements of varying width along a scan direction, the system comprising:

a light source for producing a light beam;

reading means coupled to said light source for directing said light beam at said medium so as to scan along the scan direction a first bar code symbol disposed on a first portion of said medium, detecting at least a portion of a light of variable intensity reflected off the first bar code symbol, and generating an electrical signal indicative of a detected light intensity;

writing means coupled to said light source for directing said light beam at said medium in a pattern on a second portion of said medium so as to write a second bar code symbol on said medium.

2. A system as defined in claim 1, wherein said light source is a single laser diode.

3. A system as defined in claim 1, wherein said writing means includes means coupled to said light source for pulsing said light source as said light beam is scanned in a pattern on said second portion of said medium.

4. A system as defined in claim 1, further comprising switching means for switching between said reading means and said writing means.

5. A system as defined in claim 1, wherein said medium has a light or heat sensitive surface coating on said second portion of said medium so as to form a bar code symbol when said light beam is directed thereto.

6. A system as defined in claim 1, further comprising detection means coupled to said reading means for processing said electrical signal to detect a third bar code symbol representing control indicia, said detection means being coupled to said controller so as to change said system from a reading mode to a writing mode in response to said control indicia.

7. A system as defined in claim 4, wherein said switching means functions to switch said system from writing mode to reading mode upon completion of a written operation so as to read the indicia which have been written and to verify their accuracy.

8. A system as defined in claim 1, further comprising means connected to the light source for modifying the light beam in response to changing from reading mode to writing mode or vice versa.

9. A system as defined in claim 1, further comprising means connected to said medium for moving the medium in a path generally normal to the optical path of said light beam so as to effect scanning of said medium by said light beam as said medium is moved.

10. Apparatus for reading and writing bar code symbols, the bar code symbols comprising bar and space elements of varying width along a scan direction, the apparatus comprising:

(a) a light source for emitting a light beam;

(b) an optical component disposed in the path of said beam for directing the light beam along an optical path toward a target located in a vicinity of a reference plane lying generally normal to the optical path so as to scan in the scan direction spatially adjacent portions of said reference plane, to thereby scan a first bar code symbol;

(c) control means for operating said light source in a writing mode so as to direct light to portions of said target where a second bar code symbol is to be written;

(d) sensor means disposed in a path of light reflected off the target and operative in a reading mode for detecting a portion of light of variable intensity reflected off the first bar code symbol on the target, and generating an electrical signal indicative of the detected light intensity.

11. A method for reading and writing bar code symbols on a medium, the bar code symbols comprising bar and space elements of varying width along a scan direction, the method comprising:

producing a light beam;

directing said light beam at said medium so as to illuminate a first portion of said medium, detecting at least a portion of light of variable intensity reflected off a first bar code symbol, and generating an electrical signal indicative of a detected light intensity; and directing said light beam at said medium in a pattern on a second portion of said medium so as to record a second bar code symbol on said medium.

12. A method as defined in claim 11, wherein said step of producing a light beam uses a single laser diode.

13. A method as defined in claim 11, further comprising the step of pulsing said light source as said light beam is scanned in a pattern on said second portion of said medium.

14. A method as defined in claim 11, further comprising the step of switching between said reading and writing on said medium.

15. A method as defined in claim 11, wherein said medium has a light or heat sensitive surface coating on said second portion of said medium so as to form said second bar code symbol when said light beam is directed thereto.

16. A method as defined in claim 11, further comprising the step of processing said electrical signal to detect a third bar code symbol representing a control indicia so as to change said system from a reading mode to a writing mode.

17. A method as defined in claim 11, further comprising the step of switching from writing mode to reading mode upon completion of a writing operation so as to read the second bar code symbol which has been written and to verify its accuracy.

18. A method as defined in claim 11, further comprising the step of modifying the light beam in response to changing from reading mode to writing mode or vice versa.

19. A method as defined in claim 11, further comprising the step of moving the medium in a path generally normal to the optical path of said light beam so as to effect scanning of said medium by said light beam as said medium is moved.

* * * * *